United States Patent
Bottacchi (10) Patent No.: US 9,490,908 B2
(45) Date of Patent: Nov. 8, 2016

(54) METHOD AND SYSTEM FOR RECEIVING AN OPTICAL-DUO-BINARY SIGNAL

(71) Applicant: u2t Photonics AG, Berlin (DE)

(72) Inventor: Stefano Bottacchi, Milan (IT)

(73) Assignee: U2T PHOTONICS AG, Berlin (DE)

( * ) Notice: Subject to any disclaimer, the term of this patent is extended or adjusted under 35 U.S.C. 154(b) by 98 days.

(21) Appl. No.: 14/349,374

(22) PCT Filed: Sep. 27, 2012

(86) PCT No.: PCT/EP2012/069049
§ 371 (c)(1),
(2) Date: Apr. 3, 2014

(87) PCT Pub. No.: WO2013/050288
PCT Pub. Date: Apr. 11, 2013

(65) Prior Publication Data
US 2014/0241728 A1  Aug. 28, 2014

(30) Foreign Application Priority Data

Oct. 4, 2011  (EP) ..................................... 11183827

(51) Int. Cl.
*H04J 14/02* (2006.01)
*H04B 10/69* (2013.01)
*H04B 10/67* (2013.01)

(52) U.S. Cl.
CPC ........ *H04B 10/6972* (2013.01); *H04B 10/675* (2013.01); *H04J 14/02* (2013.01)

(58) Field of Classification Search
CPC ............ H04B 10/6972; H04B 10/675; H04B 10/612; H04B 10/60; H04B 10/66; H04B 10/6932; H04J 14/02
USPC .......................................... 398/85, 207, 212
See application file for complete search history.

(56) References Cited

U.S. PATENT DOCUMENTS

| | | | |
|---|---|---|---|
| 6,697,576 B1 | 2/2004 | Rollins et al. | |
| 7,505,695 B2* | 3/2009 | Sugihara | H04B 10/675 398/202 |
| 8,494,372 B2* | 7/2013 | Eiselt | H04B 10/675 398/140 |
| 2011/0170171 A1* | 7/2011 | McCallion | H04L 27/223 359/325 |

OTHER PUBLICATIONS

Zheng X et al. ("Optimization of optical receiver for 10 Gbit/s optical duobinary transmission system", Trends in Optics and Photonics Series, vol. 54, ISBN: 978-1-55752-655-7, Mar. 17, 2001).*

Downie et al., "Experimental Measurements of the Effectiveness of MLSE against Narrowband Optical Filtering Distortion", Optical Fiber Communication Conference and Exposition National Fiber Optic Engineers Conference, ISBN 978-1-55752-831-5, pp. 1-3,dated Mar. 1, 2007.

(Continued)

*Primary Examiner* — M. R. Sedighian
(74) *Attorney, Agent, or Firm* — Foley & Lardner LLP (57) ABSTRACT

The invention inter alia relates to a method of receiving an optical-duo-binary, ODB, signal (S), which has a predefined ODB-transmission bit-rate (B), using a photoreceiver, said method comprising the step of filtering the ODB signal using a filter (10) which provides a frequency peak in the photoreceiver's frequency response located in the spectral range between 30% and 70% of the predefined ODB-transmission bit-rate.

12 Claims, 7 Drawing Sheets

(56) References Cited

OTHER PUBLICATIONS

Jinguji et al., "Synthesis of One-Input M-Output Optical FIR Lattice Circuits", Journal of Lightwave Technology, vol. 26, No. 7, ISSN: 0733-8724, pp. 853-866, dated Apr. 1, 2008.

Longhi et al., "Synthesis of fiber Bragg grating filters for optimal DPSK-emodulation", Optical Fiber Technology, vol. 14, No. 4, pp. 259-261, dated Jan. 18, 2008.

Malouin et al., "Differential Phase-Shift Keying Receiver Design Applied to Strong Optical Filtering", Journal of Lightwave Technology, vol. 25, No. 11, ISSN: 0733-8724, pp. 3536-3542, dated Nov. 2007.

Zheng X et al., "Optimisation of optical receiver for 10 Gbit/s optical duobinary transmission system", Trends in Optics and Photonics Series, vol. 54, ISBN: 978-1-55752-655-7, dated Mar. 17, 2001.

International Search Report issued in connection with International Application No. PCT/EP2012/069049 dated Nov. 19, 2012.

* cited by examiner

METHOD AND SYSTEM FOR RECEIVING AN OPTICAL-DUO-BINARY SIGNAL

The invention relates to methods and devices for receiving an optical-duo-binary, ODB, signal having a predefined ODB-transmission bit-rate.

BACKGROUND OF THE INVENTION

Due to severe optical filtering performed by today's DWDM-ODB transmission systems, the ratio between bit-rate and optical signal bandwidth may reach values of up to 1.4 bit/Hz or even more. For instance, an optical signal having an optical bandwidth (FWHM) of 32 GHz may transmit a 44.6 Gb/s data bit stream.

OBJECTIVE OF THE PRESENT INVENTION

An objective of the present invention is to provide a method for receiving optical-duo-binary signals where an optimized sensitivity performance in case of a high ratio between bit-rate and optical bandwidth may be achieved.

A further objective of the present invention is to provide a photoreceiver which may achieve an optimized sensitivity performance in case of a high ratio between bit-rate and optical bandwidth.

A further objective of the present invention is to provide an optical system which comprises a photoreceiver and an optical pre-filter, and achieves an optimized sensitivity performance in case of a high ratio between bit-rate and optical bandwidth.

BRIEF SUMMARY OF THE INVENTION

An embodiment of the present invention relates to a method of receiving an optical-duo-binary, ODB, signal having a predefined ODB-transmission bit-rate, said method comprising the step of filtering the ODB signal using a filter which provides a frequency peak in the photoreceiver's frequency response located in the spectral range between 30% and 70% of the predefined ODB-transmission bit-rate.

An advantage of this embodiment is that unsurpassed optical signal-to-noise (OSNR) values may be achieved. This is due to the inventive frequency peak. A novel modeling and simulation of the ODB transmission system as carried out by the inventor showed a correlation existing between a properly peaked frequency response of the photoreceiver and an optimized OSNR sensitivity for a given bit-rate and optical filter bandwidth. For simulation, an Adaptive Inverse Filter (AIF) has been introduced to compensate for the optical filter rolloff, accomplishing the quasi-optimum raised-cosine pulse sequence at the decision section. At low OSNR, the thermal noise, generated by the photoreceiver plays almost a negligible role and the consistent noise bandwidth increase due to the highly peaked AIF photoreceiver response almost does not degrade the SNR at the decision section, compared to the benefit in terms of the pulse reshaping and strong reduction of the intersymbol interference. The optical noise converted into signal-spontaneous beat noise density at the photoreceiver input extends over whatever is smaller between the half-width base-band optical bandwidth and the electrical noise bandwidth, and the total noise results almost independent from the photoreceiver noise bandwidth. For instance, with the proposed frequency peak in the photoreceiver's frequency response, 12 dB OSNR sensitivity at 44.6 Gb/s may be achieved.

According to a preferred embodiment, the frequency peak level is between 5 dB and 7 dB over the DC-value. The DC-value refers to the frequency response for an input signal having a frequency of 0 Hz.

The received ODB signal may be filtered in the optical domain with a Delay Line Interferometer filter having a free spectral range corresponding to between 60% and 140%, more preferably between 80% and 120%, of the ODB-transmission bit-rate.

In order to reliably achieve the described peak in the photo-receiver's frequency response in a cost-efficient manufacturing process, a Mach-Zehnder-Interferometer, MZI, filter may be employed.

For instance, the optical ODB signal may be split into a first signal portion and a second signal portion, wherein the first signal portion is filtered by a Mach-Zehnder-Interferometer, MZI, filter having a free spectral range corresponding to between 60% and 140%, more preferably between 80% and 120%, of the ODB-transmission bit-rate. Then, the filtered first signal portion and the second signal portion may be added by an optical coupler having two exit ports, each of which being connected to a photodiode. The added signal portions at each exit port may be detected with the respective photodiode. In this embodiment, a frequency peak level of 6 dB may be achieved at a frequency corresponding to half of the predefined ODB-transmission bit-rate.

The anode-terminals of both photodiodes may be connected with each other and with the input terminal of a transimpedance amplifier. As such, the transimpedance amplifier may amplify the added signals.

Even though the splitting ratio of the optical couplers may range between 20% and 80%, a splitting ratio of 50% or at least approximately 50% is preferred. In other words, the couplers may be 3 dB-couplers.

Before filtering the ODB signal, the ODB signal may be pre-filtered using an optical line pre-filter having a full-width-half-maximum bandwidth of 75% or less of the ODB-transmission bit-rate.

A further embodiment of the present invention relates to a photoreceiver adapted for receiving an optical-duo-binary, ODB, signal having a predefined ODB-transmission bit-rate. The photoreceiver comprises: at least one photodetector, and a filter providing a frequency peak in the photoreceiver's frequency response located in the spectral range corresponding to between 30% and 70% of the predefined ODB-transmission bit-rate.

The frequency peak level is preferably between 5 dB and 7 dB, more preferably 6 dB, over the DC-value.

The frequency peak is preferably located at a frequency corresponding to half of the predefined ODB-transmission bit-rate.

The filter may comprise a Delay Line Interferometer structure having a free spectral range corresponding to between 60% and 140%, more preferably between 80% and 120%, of the ODB-transmission bit-rate.

The filter may comprise a Mach-Zehnder-Interferometer having a free spectral range, wherein the free spectral range of the Mach-Zehnder-Interferometer corresponds to the ODB-transmission bit-rate.

The filter preferably comprises a first coupler having a first output and a second output, said first output being connected to an input of the Mach-Zehnder-Interferometer, a second coupler having a first input and a second input, said first input being connected to the output of said Mach-Zehnder-Interferometer, and said second input being connected to said second output of the first coupler.

The first and second couplers preferably have coupling ratios between 20% and 80%. For instance, the couplers are 3 dB-couplers.

A further embodiment of the present invention relates to a photoreceiver adapted for receiving an optical-duo-binary, ODB, signal having a predefined ODB-transmission bit-rate, said photoreceiver comprising at least one photodetector, and a at least one filter, wherein said filter comprises a first coupler having a first output and a second output, said first output being connected to an input of a Mach-Zehnder-Interferometer, said Mach-Zehnder-Interferometer having a free spectral range, a second coupler having a first input and a second input, said first input being connected to the output of said Mach-Zehnder-Interferometer, and said second input being connected to said second output of the first coupler.

The free spectral range of the Mach-Zehnder-Interferometer preferably corresponds to the ODB-transmission bit-rate.

A further embodiment of the present invention relates to an optical system comprising a photoreceiver adapted for receiving optical-duo-binary signals, and an optical pre-filter, wherein said photoreceiver comprises at least one photodetector, and a filter providing a frequency peak in the photoreceiver's frequency response, said frequency peak being located in the spectral range between 50% and 80% of the pre-filters bandwidth and having a peak level between 5 dB and 7 dB over the DC-value.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings, wherein identical or comparable parts are designated by the same reference signs throughout.

It will be readily understood that the present invention, as generally described and illustrated in the figures herein, could vary in a wide range. Thus, the following more detailed description of the exemplary embodiments of the present invention, as represented in FIGS. 1-7, is not intended to limit the scope of the invention, as claimed, but is merely representative of presently preferred embodiments of the invention.

Figure 1:
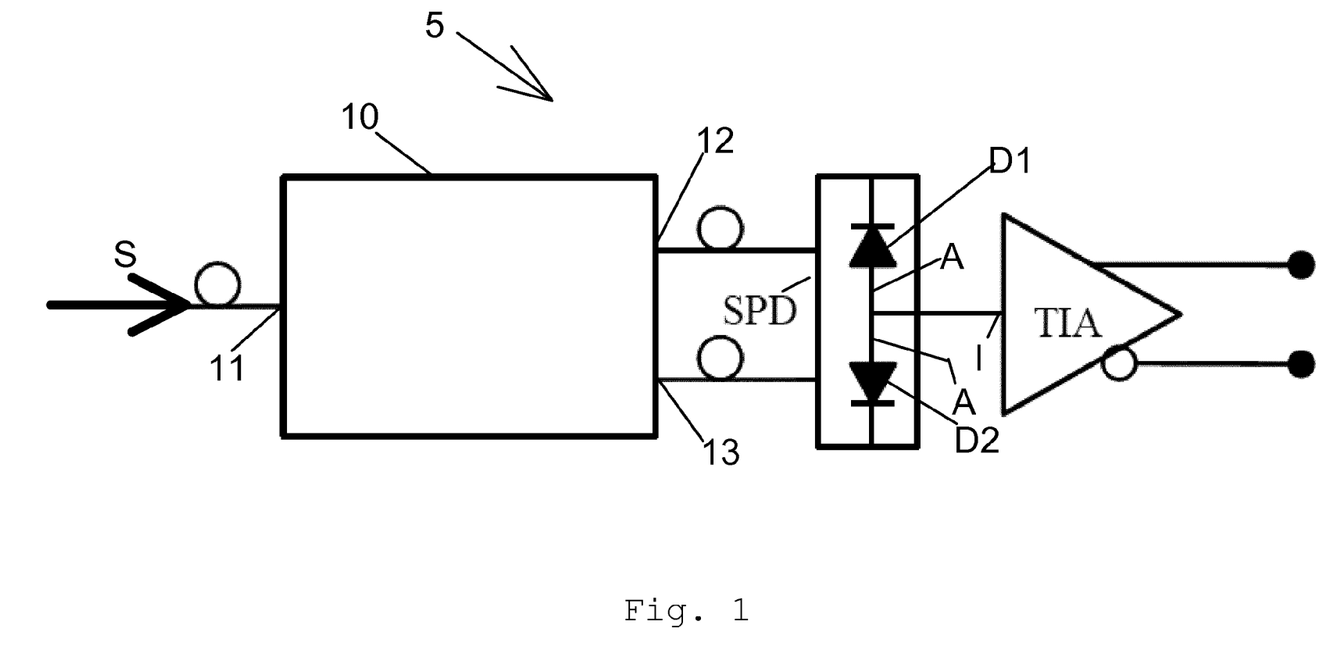
FIG. 1 shows a first exemplary embodiment of a photoreceiver according to the present invention.

FIG. 1 shows a first exemplary embodiment of a photoreceiver 5 which is capable of receiving an optical-duo-binary, ODB, signal S. The optical signal S carries a predefined ODB-transmission bit-rate.

The photoreceiver 5 comprises an interferometer filter 10, a back-to-back sum photodiode pair unit SPD and a single-ended transimpedance amplifier TIA.

The photodiode pair unit SPD comprises two photodiodes D1 and D2. The anode-terminals A of both photodiodes D1 and D2 are connected with each other and with the input terminal I of the transimpedance amplifier TIA. Thus, the transimpedance amplifier may amplify the sum of the signals that are provided by both photodiodes D1 and D2.

The interferometer filter 10 provides a frequency peak of 6 dB in the photoreceiver's frequency response located at a frequency which is equal to half of the predefined ODB-transmission bit-rate.

Figure 2:
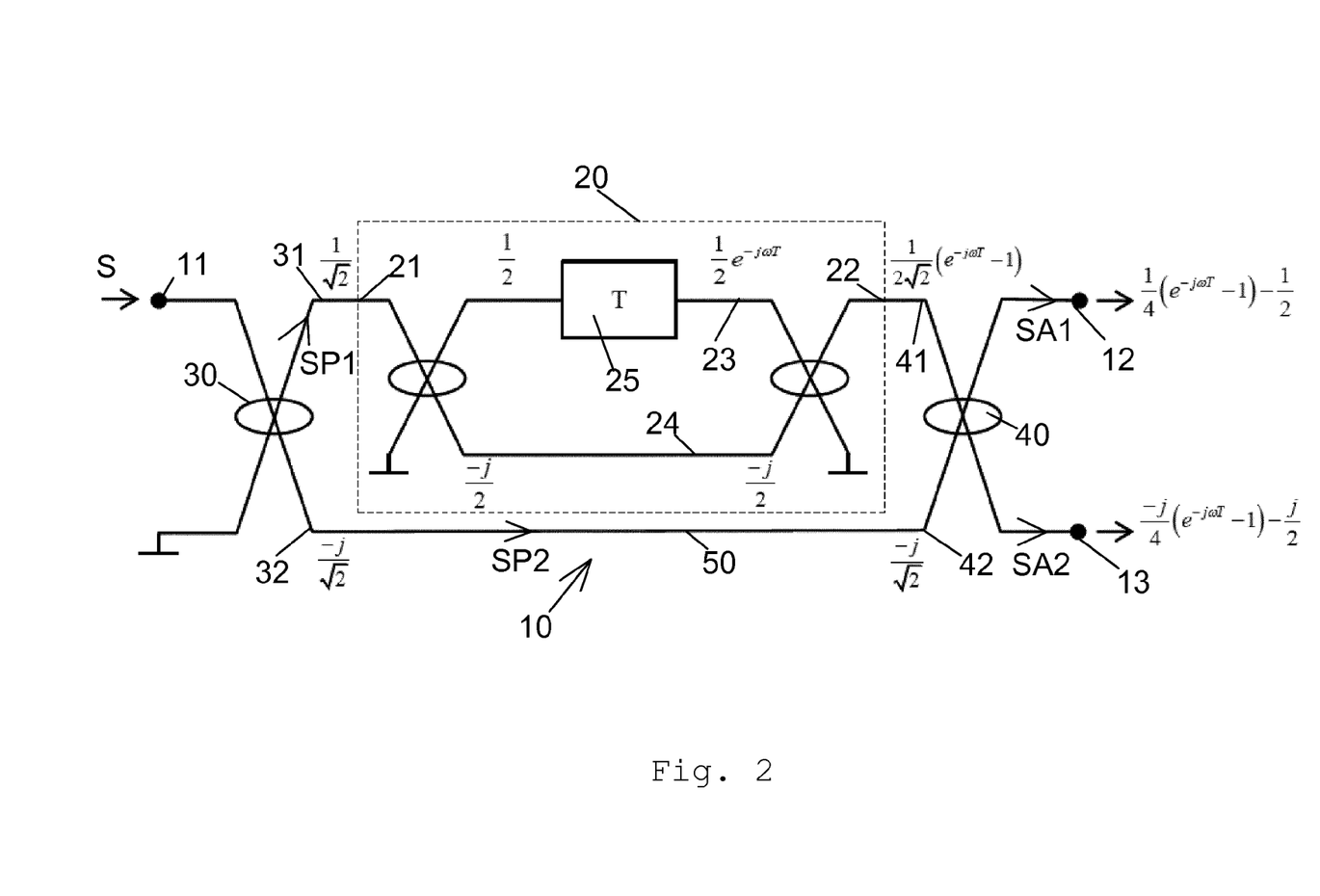
FIG. 2 shows an exemplary embodiment of an interferometer filter for the photoreceiver as shown in FIG. 1.

An exemplary embodiment of the interferometer filter 10 of FIG. 1 is shown in FIG. 2. The interferometer filter 10 is a delay line interference filter having a Mach-Zehnder-Interferometer 20, a first coupler 30, and a second coupler 40.

As shown in FIG. 2, the first coupler 30 comprises a first output 31 and a second output 32. The first output 31 is connected to an input 21 of the Mach-Zehnder-Interferometer 20.

The second coupler 40 comprises a first input 41 and a second input 42. The first input 41 is connected to the output 22 of the Mach-Zehnder-Interferometer 20. The second input 42 is connected to the second output 32 of the first coupler 30.

The Mach-Zehnder-Interferometer 20 comprises two interferometer arms 23 and 24. One of those interferometer arms, for instance interferometer arm 23, comprises a delay element 25 which provides a delay time T and thus a wavelength-dependent phase shift between both interferometer arms 23 and 24. The free spectral range FSR (FSR=1/T) of the Mach-Zehnder-Interferometer 20 is preferably equal to the predefined ODB-transmission bit-rate B. For instance, for a 44.6 Gb/s photo-receiver, the free spectral range would preferably be FSR=1/T=B=44.6 GHz.

A first signal portion SP1 of the optical signal S is filtered by the Mach-Zehnder-Interferometer 20 according to the free spectral range. The filtered first signal portion and a second signal portion SP2, which passes through waveguide 50, are added by the second coupler 40 which forwards the added signals SA1 and SA2 to the photodiodes D1 and D2 in FIG. 1.

The optical couplers 30 and 40 provide a low frequency path to the optical field. Without the optical couplers 30 and 40, the frequency response would exhibit a sine profile with a null at DC and every multiple of the FSR-value.

In the following, it is assumed that all optical couplers are balanced without insertion loss. The baseband equivalent (slowly varying envelope) field transfer function between input port 11 (see FIGS. 1 and 2) of the interferometer filter 10 and both output ports 12 or 13 (see FIGS. 1 and 2) of interferometer filter 10 are respectively:

$$H_{21}(\omega)=-j/2e^{-j\omega T/2}\sin(\omega T/2)-\tfrac{1}{2}, H_{22}(\omega)=-\tfrac{1}{2}e^{-j\omega T/2}$$
$$\sin(\omega T/2)-j/2, H_{22}(\omega)=-j\_H_{21}(\omega)+1] \quad (1)$$

The transfer function of the optical intensity envelope (OIE) at each output 12 and 13 is given by the square modulus of the expressions in equation (1):

$$|H_{21}(\omega)|^2=\tfrac{1}{4}[1+3\sin^2(\omega T/2)], H_{22}(\omega)=\tfrac{1}{4}\cos^2(\omega T/2) \quad (2)$$

The transfer function $I(\omega)$ between the sum of the output photocurrents and the optical intensity envelope applied at the input port 11 is obtained by multiplying $|H_{21}(\omega)|^2$ and $|H_{21}(\omega)|^2$ in equation (2) by the respective responsivities and summing the resulting photocurrents.

In the following, the same responsivity is assumed for both photodiodes:

$$I(\omega)=R|H_{21}(\omega)|^2+R|H_{22}(\omega)|^2=\tfrac{1}{2}R[1+\sin^2(\omega T/2)] \quad (3)$$

At DC, the interferometer loses 6 dB. The first peak is at $f_p=\tfrac{1}{2}T$ the OIE transfer function reaches the unit value. Subsequent peaks and valleys are interleaved by the same frequency interval. Any consecutive peaks or valleys are separated by the free spectral range FSR of the interferometer hence FSR=1/T.

The transimpedance amplifier TIA as shown in FIG. 1 provides a transimpedance gain with a relatively flat frequency response $Z(\omega)$. The resulting transfer function $H_R(\omega)$ of the interferometric photoreceiver 5 may then be obtained by multiplying the transfer function $I(\omega)$ in equation (3) with the transimpedance gain $Z(\omega)$ of the transimpedance amplifier TIA:

$$H_R(\omega)=\tfrac{1}{2}R[1+\sin^2(\omega T/2)]z(\omega) \quad (4)$$

Figure 3:
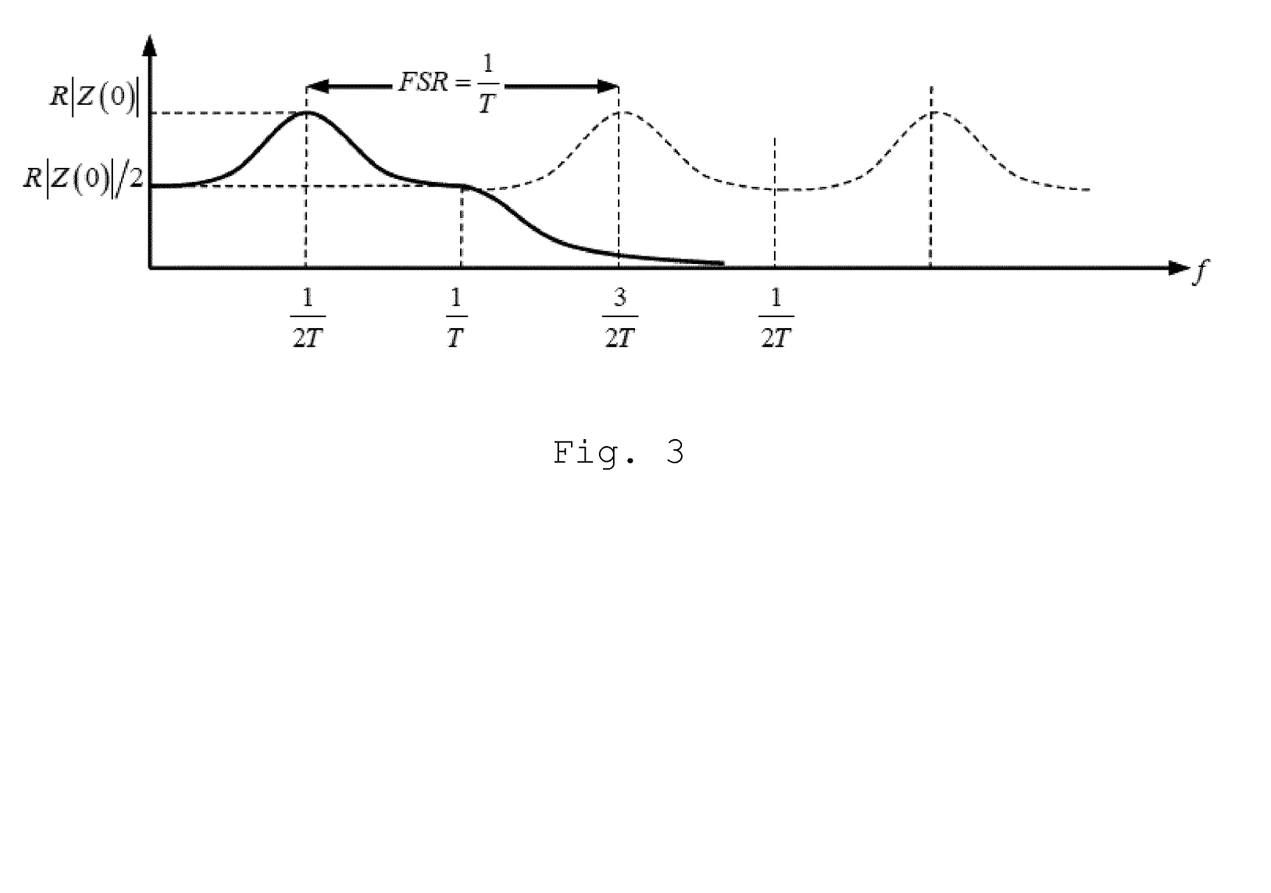
FIG. 3 shows the modulus of the transfer function $H_R(\omega)$ of the photoreceiver of FIG. 1 in an exemplary fashion.

FIG. 3 shows the modulus of the transfer function $H_R(\omega)$ of the interferometric photoreceiver 5. The peak occurs at half FSR and is 6 dB high with respect to the DC value. The transimpedance amplifier TIA cutoff is supposed to equal B=1/T.

Figure 4:
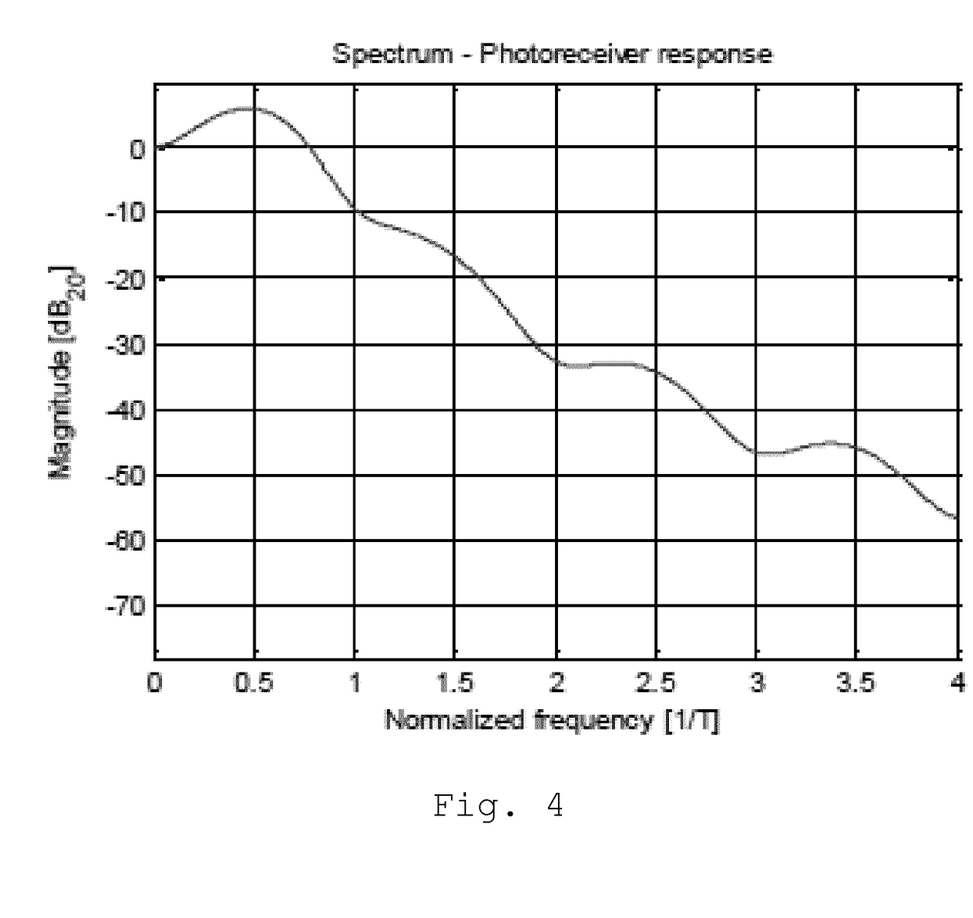
FIG. 4 shows the simulated spectrum of the response of the photoreceiver of FIG. 1 in an exemplary fashion.
Figure 5:
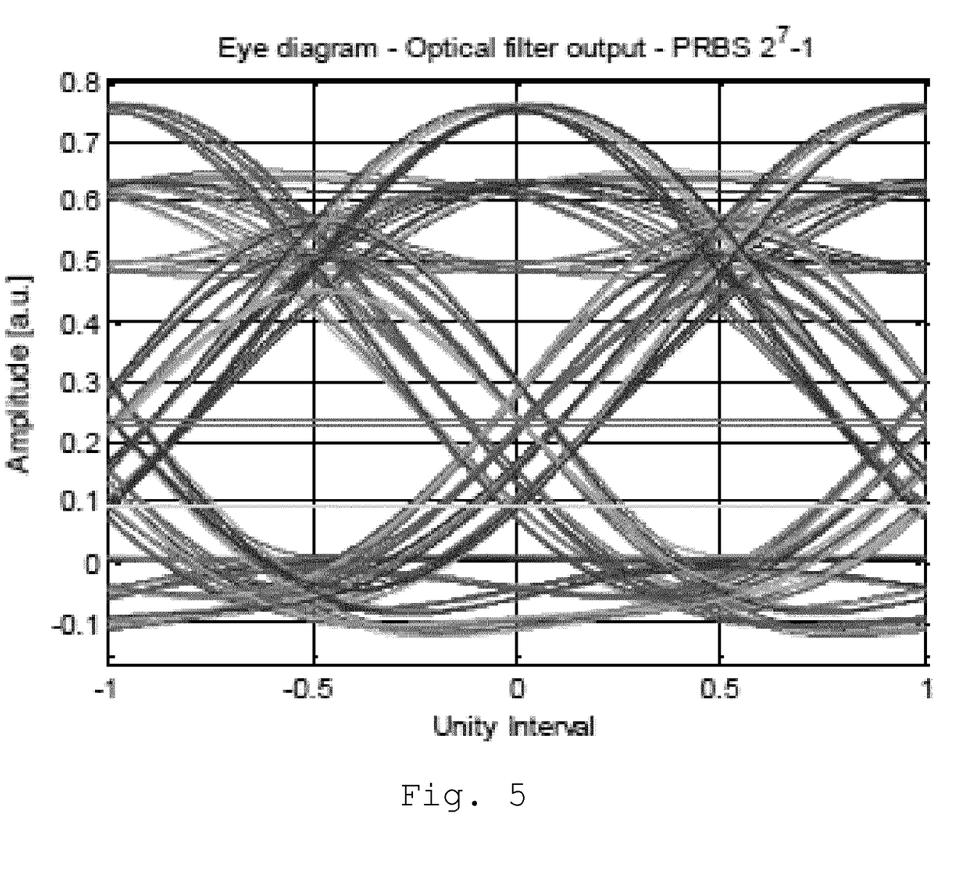
FIG. 5 shows an eye-diagramm of the photoreceiver of FIG. 1 in an exemplary fashion.

FIGS. 4 and 5 show the simulated output of the interferometric photoreceiver 5 of FIG. 1. The simulation was carried out using a Matlab® based simulator which has been developed for this purpose by the inventor. The ODB transmission system operates at B=44.6 Gb/s and the interferometer has a free spectral range FSR=44.6 GHz. The transimpedance amplifier TIA is modeled in an exemplary fashion with a fourth-order Butterworth amplifier with 35 GHz cutoff frequency.

FIGS. 4 and 5 confirm that the frequency response of photo-receiver 5 shows the expected 6 dB peak at half bit-rate frequency. At OSNR=16 dB the photoreceiver shows a bit error rate BER=2.8e−6, corresponding to as low as OSNR=11.95 dB at pre-FEC BER=2.0e−3.

An interesting feature of the photoreceiver 5 is the highly insensitive behavior of the OSNR sensitivity versus the cutoff frequency of the transimpedance amplifier TIA. This property is attractive for increasing production yield while relaxing costs.

Figure 6:
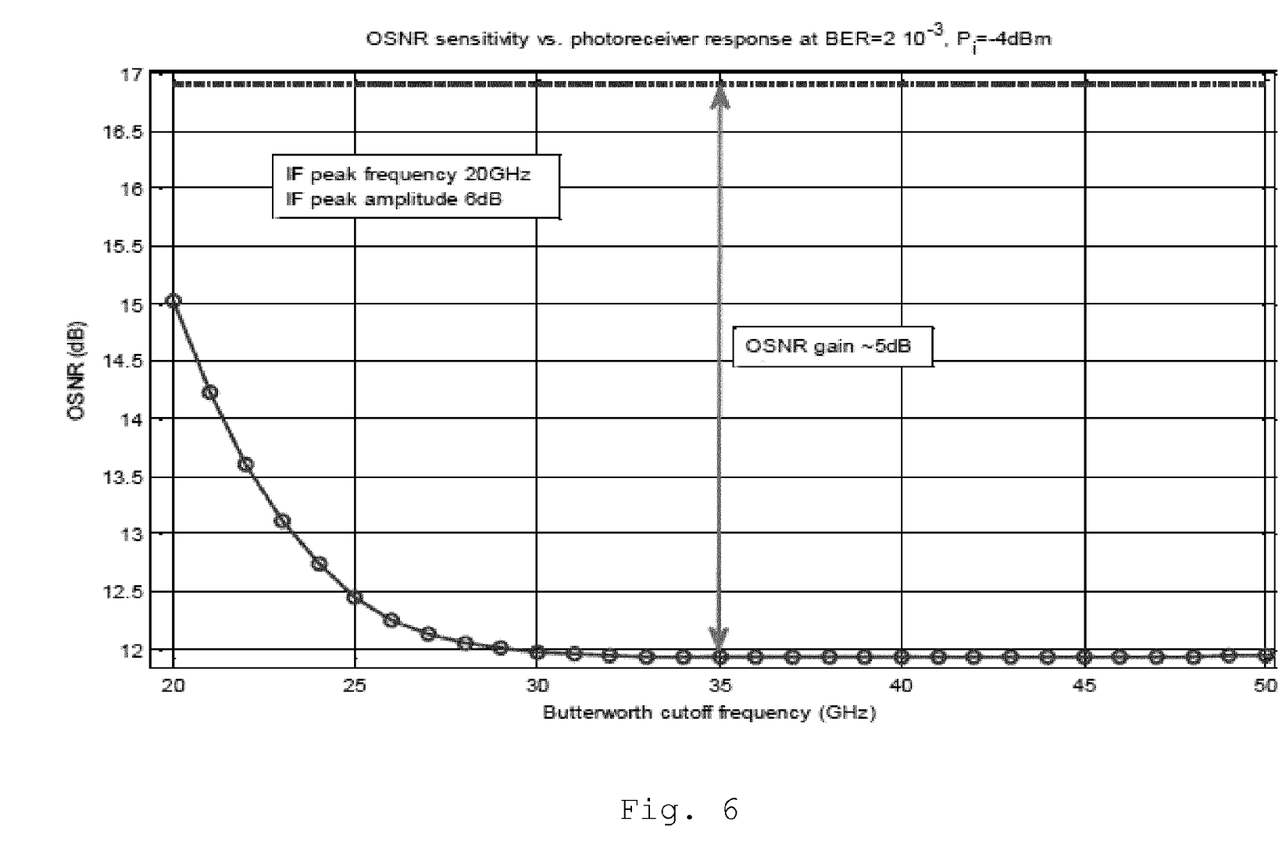
FIG. 6 shows the simulated OSNR sensitivity versus response of the photoreceiver of FIG. 1 in an exemplary fashion.

FIG. 6 shows the simulated OSNR sensitivity of the 44.6 Gb/s ODB photoreceiver 5 of FIG. 1 (with FSR=B), assuming a fourth-order Butterworth response profile of the transimpedance amplifier TIA. The calculations show that, when the cutoff exceeds 30 GHz, the OSNR sensitivity remains at the minimum value of 11.95 dB, even increasing the cutoff over 50 GHz. This confirms that the sensitivity performances of the interferometric photoreceiver 5 are almost decoupled from the high frequency TIA response.

The graph further shows the baseline OSNR=16.9 dB referred to the received ODB pattern (RDB) and assuming infinite bandwidth photodetection process without any additional noise term (thermal, RIN, . . . ). It is apparent that a large OSNR sensitivity gain of about 5 dB may be achieved with the peaked interferometric photoreceiver 5 of FIG. 1, compared to an OSNR=16.9 dB obtained with a conventional infinite flat response and noiseless photodetection.

In summary, the interferometric photoreceiver 5 of FIG. 1 provides a high spectral efficiency and a high OSNR sensitivity. A gain of about 5 dB may be achieved at a bit-rate of 44.6 Gb/s and an optical signal bandwidth of 32 GHz.

Figure 7:
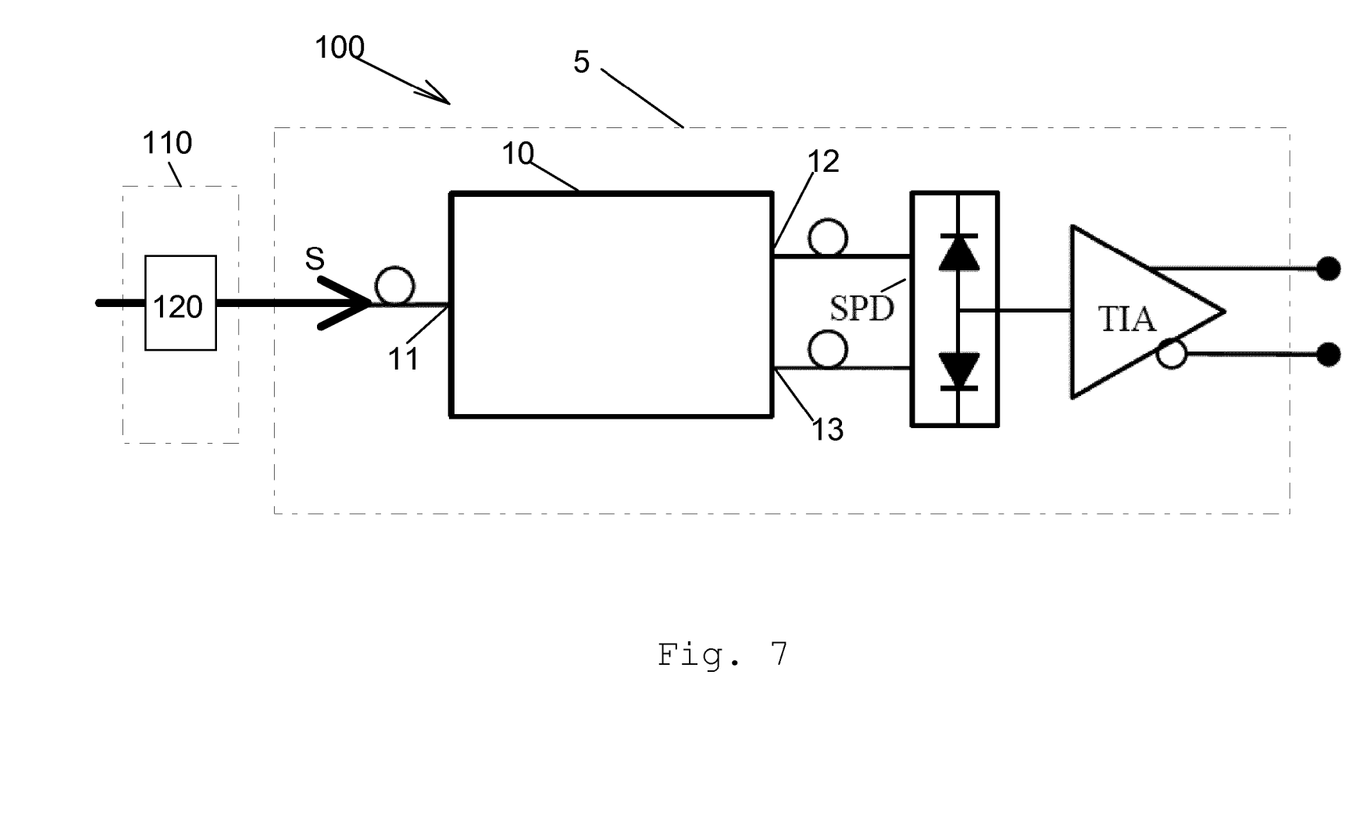
FIG. 7 shows an exemplary embodiment of an optical system according to the present invention.

FIG. 7 shows an exemplary embodiment of an optical system 100 which comprises the photoreceiver 5 of FIG. 1. The interferometer filter 10 of photoreceiver 5 may correspond to the interferometer filter 10 as shown in FIG. 2, for instance. As such the photoreceiver 5 is capable of receiving optical-duo-binary signals.

The optical system 100 further comprises a DWDM-filter unit 110 which has at least one optical line pre-filter 120. The optical line pre-filter 120 passes the optical channel S, which is meant to be received by the photoreceiver 5, and blocks all other channels. For receiving an optical-duo-binary signal S, which has an ODB-transmission bit-rate B (e.g. B=44.6 Gb/s), the optical bandwidth fo of the optical line pre-filter 120 is preferably about 70% of B (e.g. fo=0.7 *44.6 $10^9$ 1/s=32 GHz).

The frequency response of the photoreceiver 5 preferably comprises a frequency peak located in the spectral range between 50% and 80%, preferably between 65% and 75%, of the pre-filters bandwidth (e.g. 32 GHz). This corresponds to about half of ODB-transmission bit-rate of 44.6 Gb/s. The peak level is preferably between 5 dB and 7 dB over the DC-value.

The invention claimed is:

1. Method of receiving an optical-duo-binary, ODB, signal (S), which has a predefined ODB-transmission bit-rate (B), using a photoreceiver, said method comprising the step of filtering the ODB signal,
   wherein said ODB signal is filtered using a filter which provides a frequency peak in the photoreceiver's frequency response, said frequency peak being located in the spectral range between 30% and 70% of the predefined ODB-transmission bit-rate, and,
   wherein before said step of filtering the ODB signal using said filter, the ODB signal (S) is pre-filtered using an optical line pre-filter having a full-width-half-maximum bandwidth of 75% or less of the ODB-transmission bit-rate.

2. Method of claim 1, wherein said frequency peak exceeds the frequency response for an input signal having a frequency of 0 Hz.

3. Method of claim 1,
   wherein the frequency peak level of said frequency peak is between 5 dB and 7 dB over the DC-value, and wherein the DC-value refers to the frequency response for an input signal having a frequency of 0 Hz.

4. Method according to claim 1,
   wherein the ODB signal is filtered in the optical domain with a delay line interferometer filter having a free spectral range corresponding to between 60% and 140% of the ODB-transmission bit-rate.

5. Method according to claim 1,
   wherein the optical ODB signal (S) is split into a first signal portion (SP1) and a second signal portion (SP2), wherein the first signal portion is filtered by a Mach-Zehnder-Interferometer filter (20) having a free spectral range (FSR) corresponding to between 60% and 14% of the ODB-transmission bit-rate, wherein the filtered first signal portion and the second signal portion are added by coupler (40) having two exit ports, each of which being connected to a photodiode (D1, D2), and wherein the added signal portions (SA1, SA2) at each exit port are detected with the respective photodiode.

6. Photoreceiver adapted for receiving an optical-duo-binary, ODB, signal (S) having a predefined ODB-transmission bit-rate comprising:

at least one photodetector (D1, D2), and a filter, said filter provides a frequency peak in the photoreceiver's frequency response, said frequency peak being located in the spectral range corresponding to between 30% and 70% of the predefined ODB-transmission bit-rate (B), wherein the filter (10) comprises a Mach-Zehnder-Interferometer (20) having a free spectral range (FSR), and wherein the free spectral range (FSR) of the Mach-Zehnder-Interferometer corresponds to the ODB-transmission bit-rate (B), a first coupler (30) having a first output (31) and a second output (32), said first output being connected to an input (21) of the Mach-Zehnder-Interferometer (20), and, a second coupler (40) having a first input (41) and a second input (42), said first input being connected to the output (22) of said Mach-Zehnder-Interferometer (20), and said second input (42) being connected to said second output (32) of the first coupler (30).

7. Photoreceiver of claim 6, wherein said frequency peak level is between 5 dB and 7 dB, preferably 6 dB, over the DC-value, wherein the DC-value refers to the frequency response for an input signal having a frequency of 0 Hz and/or wherein the frequency peak is located at a frequency corresponding to half of the predefined ODB-transmission bit-rate.

8. Photoreceiver according to claim 6, wherein the filter (10) comprises a Delay Line Interferometer structure having a free spectral range (FSR) corresponding to between 60% and 140% of the ODB-transmission bit-rate.

9. Photoreceiver according to claim 6, wherein the first and second couplers have coupling ratios between 20% and 80%.

10. Optical system (100) comprising a photoreceiver (5) according to claim 6, and an optical line pre-filter (120), wherein the filter of said photoreceiver provides a frequency peak in the photoreceiver's frequency response, said frequency peak being located in the spectral range between 50% and 80% of the pre-filters (120) bandwidth and having a peak level between 5 dB and 7 dB over the DC-value.

11. Photoreceiver (5) adapted for receiving an optical-duo-binary, ODB, signal (S) having a predefined ODB-transmission bit-rate (B), said photoreceiver (5) comprising at least one photodetector (D1, D2), and a at least one filter (20), wherein said filter (20) comprises a first coupler (30) having a first output (31) and a second output (32), said first output (31) being connected to an input (21) of a Mach-Zehnder-Interferometer (20), said Mach-Zehnder-Interferometer having a free spectral range (FSR), a second coupler (40) having a first input (41) and a second input (42), said first input (41) being connected to the output (22) of said Mach-Zehnder-Interferometer, and said second input (42) being connected to said second output (32) of the first coupler (30).

12. Photoreceiver according to claim 11, wherein the free spectral range (FSR) of the Mach-Zehnder-Interferometer (20) corresponds to the ODB-transmission bit-rate (B).

\* \* \* \* \*